W. K. LENHART.
LAMP OR ILLUMINATOR FOR AUTOS AND OTHER VEHICLES.
APPLICATION FILED MAR. 17, 1911.
1,024,210.
Patented Apr. 23, 1912.
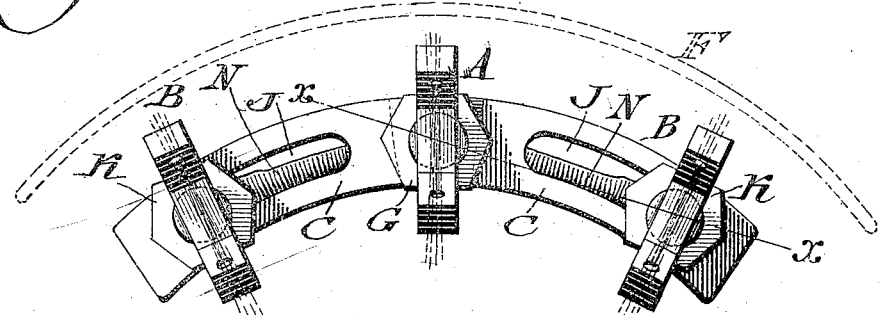
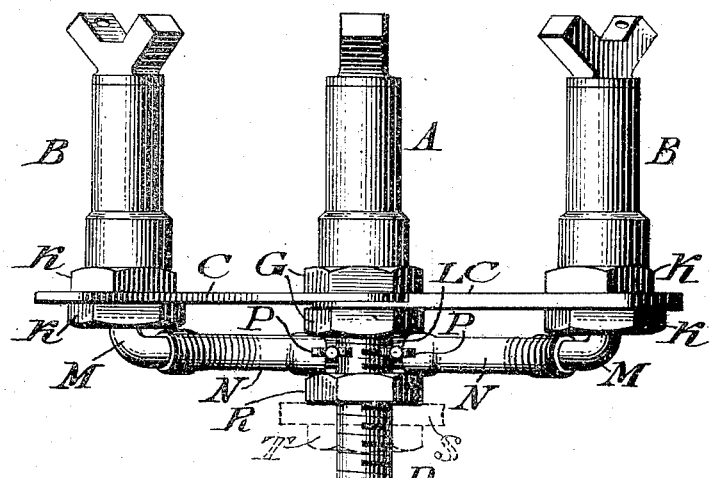
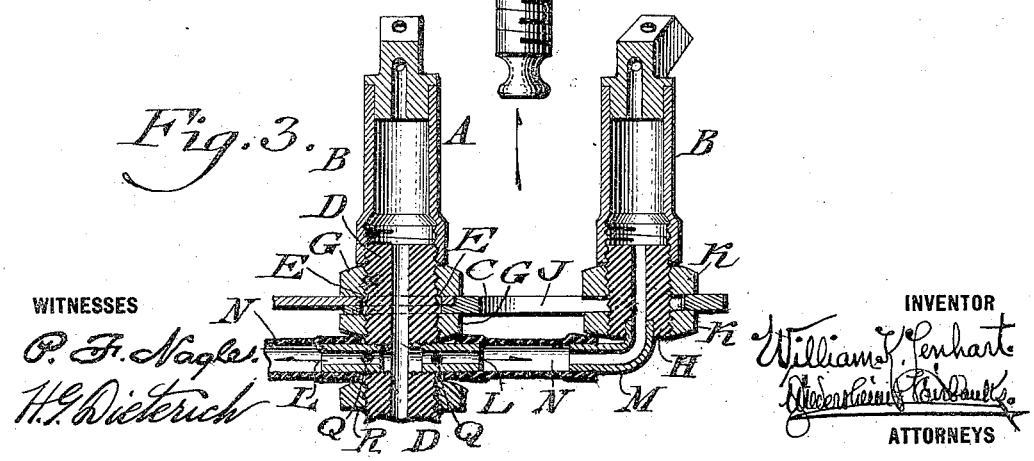

UNITED STATES PATENT OFFICE.

WILLIAM K. LENHART, OF PHILADELPHIA, PENNSYLVANIA, ASSIGNOR TO LENHART MFG. CO. INC., A CORPORATION OF PENNSYLVANIA.

LAMP OR ILLUMINATOR FOR AUTOS AND OTHER VEHICLES.

1,024,210.  Specification of Letters Patent.  Patented Apr. 23, 1912.

Application filed March 17, 1911. Serial No. 615,011.

*To all whom it may concern:*

Be it known that I, WILLIAM K. LENHART, a citizen of the United States, residing in the city and county of Philadelphia, State of Pennsylvania, have invented a new and useful Lamp or Illuminator for Autos and other Vehicles, of which the following is a specification.

My invention consists of a lamp or illuminator for an auto and other vehicles, the same being composed of a plurality of burners which are arranged at different angles to a reflector, so as to direct the light of said burners in different directions notably directly ahead and to the right and left, whereby the path of the vehicle in front will be illuminated to a width greater than that afforded by direct ahead, a feature of importance particularly when the vehicle turns aside or around corners and curves, said burners being so mounted that they may be adjusted angularly and relatively to each other.

The invention is satisfactorily illustrated in the accompanying drawing, but the important instrumentalities thereof may be varied, and so it is to be understood that the invention is not limited to the specific arrangement and organization shown and described.

Figure 1 represents a top or plan view of a vehicle lamp or illuminator embodying my invention. Fig. 2 represents a front view thereof. Fig. 3 represents a vertical section of a portion on line x—x Fig. 1.

Similar letters of reference indicate corresponding parts in the figures.

Referring to the drawings:—A and B designate a series of vertically arranged burners which are supported side by side on the arms C, the central burner A having its lower end connected with the tubular plug D which is passed freely through slots E in the ends of said arms C, said ends overlapping whereby the arms may be turned on the plug D as a pivot so as to change the angular position of the side burners B with reference to the reflector F, which is rearward of the several burners A B, and sustained on the vehicle in any suitable manner (not necessarily shown).

The plug D is firmly secured to the arms C by means of the nuts G which engage threads on the exterior of said plug and are adapted to tighten against opposite sides of said arms, it being evident that when the nuts are loosened, the arms C may be turned on the plug D to effect the angular adjustment of the burners B as above. After said adjustment is accomplished, the nuts are again tightened to hold the arms firmly in position. Each side burner B is connected at its lower end with the tubular plug H, the latter occupying the elongated curved slot J in the respective arm C, it being evident that the burners B may be adjusted nearer to or farther from the central burner A, according to requirements, and assist in effecting the angular adjustment of said side burners. On each plug H are nuts K, which are on opposite sides of the arms C, so as to clamp the plug to the latter and thus firmly sustain the burner B in adjusted position on the arms C. Connected with the plug D of the central burner are the nipples L which extend in opposite directions therefrom, and are in communication with the bore of said plug. Connected with the plug H of each side burner, is the nipple M which is in communication with the bore of said plug.

Extending from each nipple M to one of the nipples L and secured thereto is the flexible or pliable tube N, which forms means of communication for said nipples and consequently for the plug of the central burner with the plugs of the side burner, it being noticed that the plug D is adapted to receive gas or illuminating fluid which is supplied to the central burner and distributed by means of the nipples L, tubes N, and nipples M to the plugs H, and consequently to the side burners, it being noticed that said tubes N yield in the adjustment of said side burners either in the slots J of the arms C, or the pivotal motions of the latter on the central burner, whereby the supply of gas or illuminating fluid to all of the burners may be maintained. The lower portion of the plug D provides means for attachment of a conveyer for gas or other illuminating fluid from a suitable tank, whereby the burners A B may be supplied with such gas or fluid for evident purposes. The nipples L are provided with valves P, whose seats Q are in the walls thereof, so that the supply of gas or illuminating fluid may be regulated or entirely cut off from the side burners when service of the latter is not required.

The plug D may be provided with a nut

R, the same being below the nipples L, so as to tighten said plug to the upper side of the piece S which is located on the vehicle and adapted to support the lamp or illuminator, said plug having also thereon, a nut such as T which is adapted to tighten against the under side of said piece, thus providing a strong connection for the plug with said piece. In the present instance the piece S and nut T are shown dotted as other members may be employed, as the sustaining means for the plug D and connected parts.

Having thus described my invention what I claim as new and desire to secure by Letters Patent, is:—

1. In an illuminator of the character stated, a burner, means for stationarily supporting the same, a burner on the side of the first-named burner, a curved arm carrying the side burner, said arm being slotted, and means for movably supporting said arm, said slot and supporting means permitting adjustment of the side burner to and from the first-named burner and angularly with reference to a reflector.

2. In an illuminator of the character stated, a burner, means for stationarily supporting the same, a burner on the side of the first-named burner, an arm having a curved slot and carrying said side burner, means for pivotally mounting said arm on the support of the first-named burner as an axis, and means for securing said arm rotatably in position, said side burner being slidably mounted in the slot of said arm whereby it may be horizontally adjusted in a curved path to and from the first-named burner.

3. In an illuminator of the character stated, a central burner, burners on the sides of the same, means for supporting said central burner, arms having longitudinally-extending slots therein, and means for supporting said arms, said slots being adapted to movably receive members of the side burners thereon for adjustment of the latter to and from each other and angularly with reference to a reflector.

4. In an illuminator of the character stated, a central burner, arms pivotally supported on a member thereof, said arms having longitudinally-extending slots therein, burners on the side of said central burner, the same having members adjustably fitted in said slots, and means for securing said arms, and said side burners in set position.

5. In an illuminator of the character stated, a burner, means for stationarily supporting the same, an arm, means for pivotally mounting said arm, a burner slidably supported on said arm, nipples on said burners forming communications for the same, and flexible tubular connections for said nipples.

6. In an illuminator of the character stated, a burner, means for stationarily supporting the same, an arm, means for pivotally mounting said arm, a burner slidably supported on said arm, nipples on said burners forming communications for the same, flexible tubular connections for said nipples, and a valve for the second named burner independent of the supply pipe of the first named burner.

WILLIAM K. LENHART.

Witnesses:
JOHN A. WIEDERSHEIM,
N. BUSSINGER.